P. A. NOACK.
THRESHING MACHINE.
APPLICATION FILED MAR. 25, 1918.
1,269,109.
Patented June 11, 1918.
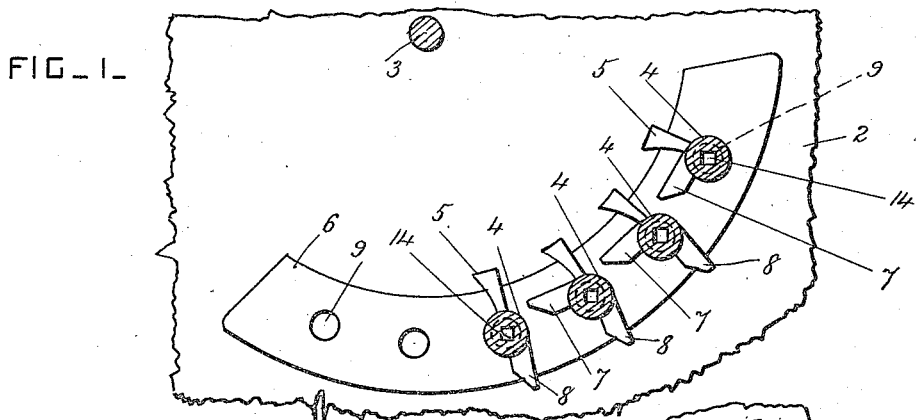
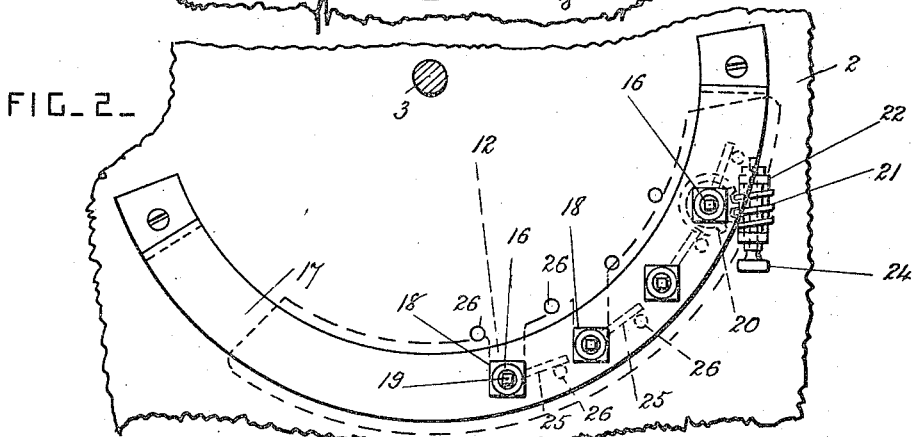
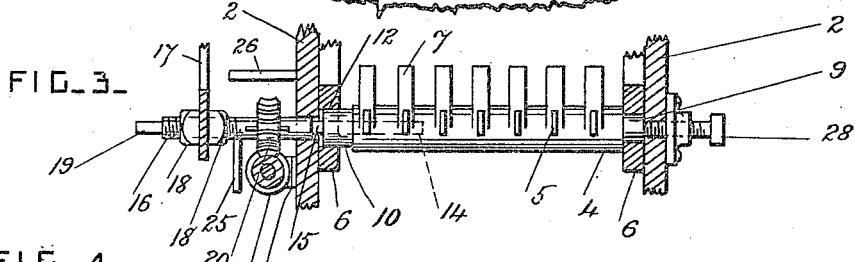
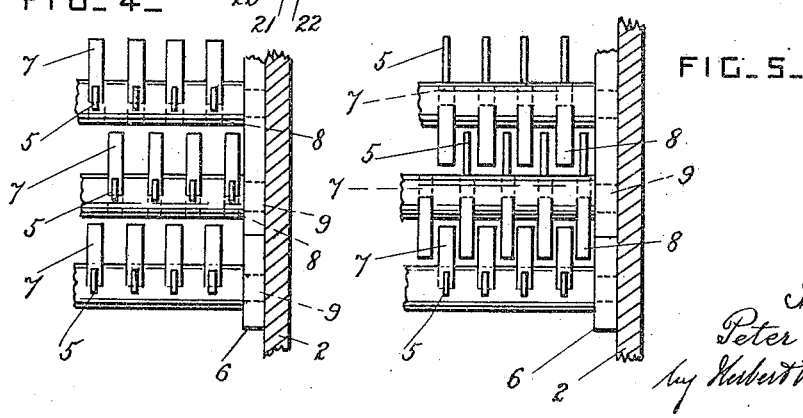
Inventor
Peter A. Noack
by Herbert W. T. Jenner
Attorney

UNITED STATES PATENT OFFICE.

PETER A. NOACK, OF GUTTENBERG, IOWA.

THRESHING-MACHINE.

1,269,109.  Specification of Letters Patent.  Patented June 11, 1918.

Application filed March 25, 1918. Serial No. 224,501.

*To all whom it may concern:*

Be it known that I, PETER A. NOACK, a citizen of the United States, residing at Guttenberg, in the county of Clayton and State of Iowa, have invented certain new and useful Improvements in Threshing-Machines, of which the following is a specification.

This invention relates to threshing machines provided with toothed threshing cylinders and toothed concaves; and it consists in the novel construction of the concave and its accessories, as hereinafter fully described and claimed, which enables the thresherman to vary the operation of the toothed bars of the concave from time to time without stopping the threshing machine.

In the drawings, Figure 1 is a longitudinal section through a concave constructed according to this invention and showing all its teeth in action. Fig. 2 is a side view of the locking bracket and the shafts which operate the bars of the concave. Fig. 3 is a detail view of one bar and its co-acting parts. Fig. 4 is a diagram showing in a plan view portions of three bars with their teeth raised. Fig. 5 is a similar diagram but shows two bars with their teeth turned down out of action.

The threshing machine has a casing 2, and 3 is the shaft of the revoluble threshing cylinder. The cylinder is not shown as it is a toothed cylinder of any approved construction. The concave is formed of a series of bars 4 provided with threshing teeth 5 and mounted in the side bars 6 of any suitable framing or support which is arranged in the casing adjacent to the threshing cylinder in the usual way.

Six concave bars are usually provided but only four are shown, as the additional middle bars are similar to the two middle bars as shown. The threshing teeth 5 of the concave are arranged in staggered relation, and the threshing teeth of the cylinder pass between them as the cylinder is revolved.

The first or top bar of the concave has a row of grate teeth 7 which project rearwardly from it and at substantially a right angle to its threshing teeth. The second and third bars of the concave have similar grate teeth 7, and in addition they also each have a row of grate teeth 8 arranged at substantially a right angle to their grate teeth 7 and projecting forwardly. The fourth or last bar has a single row of grate teeth 8 similar to those of the middle bars. The teeth 8 of each bar are arranged to work in the spaces between the teeth 7 of the next adjacent bar. Each bar of the concave has a short shaft or pivot 9 at one end, which is journaled in a hole in one side bar 6 of the concave frame. Each bar has also a bearing 10 at its other end which is journaled in a notch 12 in the other side bar of the frame. Each bar has also a rectangular hole 14 in one end portion, and 15 is a rectangular operating shaft which engages with the hole 14 slidably. The shaft projects from the casing and has a screw-threaded end portion 16 which projects through a hole in a locking member or bracket 17 arranged outside the casing. Nuts 18 are screwed on the shaft upon opposite sides of the locking bracket, and lock the shaft to the bracket when screwed up against it. The locking bracket is secured rigidly to the casing in any convenient way.

The shafts 15 are revolved in any convenient way, and they may have square end portions 19 to receive a wrench, but they are preferably revolved by means of a worm wheel 20 and a worm 21. The worm wheel is secured to the shaft, and the worm engages with it and is journaled in a bracket 22 secured to the casing, and is provided with an operating handle or knob 24. Each shaft is provided with a radially projecting finger 25, and 26 are stops on the casing for the fingers 25 to engage with, so that the tilting motion of the concave bars is limited.

Each concave bar has an adjusting screw 28 which is carried by the casing, and which bears against the end of its short shaft or pivot 9. This screw and the inner locking nut afford a means for adjusting the concave bar longitudinally so that its threshing teeth may be set accurately between the threshing teeth of the cylinder.

When the parts are in the position shown in Figs. 1 and 4, all the threshing teeth of the concave are raised and in action. When the parts are in the positions shown in Fig. 5, the threshing teeth of two concave bars are turned down and are out of action. When any middle concave bar is tilted in this manner, its threshing teeth are placed between the grate teeth of the bar next behind it, and its forwardly projecting grate teeth are raised into the spaces between the grate teeth of the bar next in front of it. By varying the number of threshing teeth in this manner the threshing machine in action can not only be changed to suit wheat, oats, barley, and other kinds of grain, and the change can be made without stopping the machine, but it can also be changed to suit different grades of the same grain, which is sometimes desirable. The concave bars can also be removed from the machine by taking out the operating shafts, and lifting the bars out of the concave frame.

What I claim is:

1. A threshing machine concave, comprising a series of pivoted concave bars provided with threshing teeth and grate teeth, and means for tilting the said bars to place the threshing teeth of one bar out of action and between the grate teeth of the bar next to it in the series.

2. A threshing machine concave, comprising a series of concave bars, the end bars of the series each having a row of threshing teeth and a row of grate teeth, and the intermediate bars having each a row of threshing teeth and two rows of grate teeth arranged at an angle to each other, and means for tilting the said bars to place the threshing teeth of one bar out of action and between the grate teeth of the bar next to it in the series.

3. A threshing machine concave, comprising a casing, a series of pivoted concave bars provided with threshing teeth and arranged in the casing, a locking member secured outside the casing, tilting shafts operatively connected with the said bars and having screwthreaded portions which project through holes in the said member, and locking nuts screwed on the said shafts and arranged on opposite sides of the said member.

4. A threshing machine concave, comprising a casing, a series of pivoted concave bars mounted in the casing and provided with threshing teeth, adjusting screws carried by the casing and operating endwise on the said bars to adjust them longitudinally, a locking member secured outside the casing on the other side of it from the said screws, tilting shafts operatively connected with the said bars and having screwthreaded portions which project through holes in the said member, and locking nuts screwed on the said shafts and arranged on opposite sides of the said member.

5. A threshing machine concave, comprising a casing, concave frame bars supported in the casing and provided with holes and notches respectively, removable concave bars provided with threshing teeth and having pivots at one end which engage with the holes of one frame bar and having bearings at the other end which are mounted in the notches of the other frame bar, a locking member secured outside the casing, removable tilting shafts slidably connected with the concave bars and having screwthreaded portions which project through holes in the said member, and locking nuts screwed on the said shafts and arranged on opposite sides of the said member.

In testimony whereof I have affixed my signature.

PETER A. NOACK.

Copies of this patent may be obtained for five cents each, by addressing the "Commissioner of Patents, Washington, D. C."